(12) United States Patent
Davis et al.

(10) Patent No.: US 11,034,368 B2
(45) Date of Patent: Jun. 15, 2021

(54) CONDITIONED AIR DISTRIBUTION CEILING PLENUM

(71) Applicant: Union Pacific Railroad Company, Omaha, NE (US)

(72) Inventors: Brian L. Davis, Saint Charles, MO (US); Mark Horne, Desoto, MO (US)

(73) Assignee: UNION PACIFIC RAILROAD COMPANY, Omaha, NE (US)

( * ) Notice: Subject to any disclaimer, the term of this patent is extended or adjusted under 35 U.S.C. 154(b) by 343 days.

(21) Appl. No.: 15/966,402

(22) Filed: Apr. 30, 2018

(65) Prior Publication Data

US 2019/0329797 A1 Oct. 31, 2019

(51) Int. Cl.
*B61D 27/00* (2006.01)
*B60H 1/00* (2006.01)
*F24F 13/02* (2006.01)
*B60H 1/24* (2006.01)

(52) U.S. Cl.
CPC ........ *B61D 27/009* (2013.01); *B60H 1/00564* (2013.01); *B60H 1/245* (2013.01); *F24F 13/0245* (2013.01); *F24F 13/0254* (2013.01)

(58) Field of Classification Search
CPC .............. B61D 27/009; B61D 27/0027; B61D 27/0018; B60H 1/00364; B60H 1/245; B60H 1/247
USPC ........................... 454/83–117, 137, 248, 292
See application file for complete search history.

(56) References Cited

U.S. PATENT DOCUMENTS

| | | | | |
|---|---|---|---|---|
| 3,879,955 A | * | 4/1975 | Dostal ................... | F25D 17/005 62/89 |
| 5,168,717 A | * | 12/1992 | Mowatt-Larssen ......................... | B60H 1/3235 454/90 |
| 6,508,076 B1 | * | 1/2003 | Gast ...................... | B65D 88/745 62/408 |
| 6,533,654 B2 | * | 3/2003 | DeRegge ................ | B05B 16/60 454/52 |

* cited by examiner

*Primary Examiner* — Vivek K Shirsat
*Assistant Examiner* — Ko-Wei Lin
(74) *Attorney, Agent, or Firm* — Daniel J. Honz; Advent, LLP (57) ABSTRACT

Embodiments of the disclosure can relate to a ceiling mounted air distribution system for a railcar. According to one embodiment of the disclosure, a ceiling-mounted air distribution plenum may include: a diffuser configured to transmit air to at least one first air channel, the at least one first air channel having a first end configured to couple to the diffuser, a second end distal from the first end; at least one second air channel disposed proximate to and longitudinally with the at least one first air channel, the at least one second air channel having a first end configured to couple to the diffuser, a second end distal from the first end, and at least one air distribution hole, and at least one channel divider disposed to separate the at least one first air channel and the at least one second air channel.

13 Claims, 6 Drawing Sheets

CONDITIONED AIR DISTRIBUTION CEILING PLENUM

BACKGROUND

Embodiments of this disclosure generally relate to railcars, and more specifically, to systems and methods for a ceiling mounted air distribution plenum in a railcar. Railcars may be used to transport various products, including perishable items that may need refrigeration. In a railcar designed as a refrigerated insulated box car, distribution of conditioned air throughout the railcar is a key consideration. Inefficient distribution of conditioned air inside the railcar may lead to spoilage of perishable products being transported by the railcar. Also, a distribution system for delivering conditioned air to the railcar must be located such that it may not obstruct the transport of products and goods within the railcar.

BRIEF DESCRIPTION OF THE DISCLOSURE

Some or all of the above needs and/or problems may be addressed by certain embodiments of the disclosure. Certain embodiments may include systems and methods for a ceiling mounted air distribution plenum. According to one embodiment of the disclosure, a ceiling-mounted air distribution plenum may include: a diffuser that may be configured to transmit conditioned air to at least one first air channel, the at least one first air channel may have a first end coupled to the diffuser, a second end distal from the first end; at least one second air channel may be disposed proximate to and longitudinally with the at least one first air channel, the at least one second air channel may have a first end coupled to the diffuser, a second end distal from the first end, and at least one air distribution hole that may be disposed longitudinally along the at least one second air channel, and at least one channel divider that may be disposed to separate the at least one first air channel and the at least one second air channel.

According to another embodiment of the disclosure, a method can be provided. The method may include: coupling an air distribution plenum to a diffuser. The air distribution plenum may include: at least one first air channel having a first end coupled to the diffuser, a second end distal from the first end, at least one second air channel that may be disposed proximate to and longitudinally with the at least one first air channel, the at least one second air channel may have a first end coupled to the diffuser, a second end distal from the first end, and at least one air distribution hole that may be disposed longitudinally along the at least one second air channel, and at least one channel divider that may be disposed to separate the at least one first air channel and the at least one second air channel. The method may further include attaching the air distribution plenum to a ceiling of a railcar via the at least one channel divider.

According to another embodiment of the disclosure, a railcar system can be provided. The railcar system can include a railcar, a diffuser coupled to the at least one first air channel, and a ceiling-mounted air distribution plenum assembly that may be coupled to the railcar, the ceiling-mounted air distribution plenum assembly can include: at least one first air channel having a first end that may be coupled to a diffuser, a second end distal from the first end, wherein the at least one first air channel may extend substantially a length of the railcar, at least one second air channel that may be disposed proximate to and longitudinally with the at least one first air channel, the at least one second air channel may have a first end coupled to the diffuser, a second end distal from the first end, and at least one air distribution hole that may be disposed longitudinally along the at least one second air channel, and at least one channel divider that may be disposed to separate the at least one first air channel and the at least one second air channel, wherein the at least one channel divider may be coupled to a ceiling of the railcar. In another embodiment of the disclosure, the at least one first air channel may include at least one air distribution hole that may be disposed longitudinally along the at least one first air channel.

Other embodiments, features, and aspects of the disclosure will become apparent from the following description taken in conjunction with the following drawings.

The detailed description is described with reference to the accompanying figures. The use of the same reference numbers in different instances in the description and the figures may indicate similar or identical items.

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these example embodiments, which are also referred to herein as "examples," are described in enough detail to enable those skilled in the art to practice the present subject matter. The example embodiments may be combined, other embodiments may be utilized, or structural, logical, and mechanical changes may be made, without departing from the scope of the claimed subject matter. Like numbers refer to like elements throughout.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to systems and methods for a ceiling-mounted air distribution plenum in a railcar. For example, as will be described in greater detail herein, the ceiling-mounted air distribution plenum may comprise: a diffuser that may be configured to transmit conditioned air to at least one first air channel, that at least one first air channel may have a first end coupled to the diffuser, a second end distal from the first end, and at least one air distribution hole that may be disposed longitudinally along the at least one first air channel, at least one second air channel that may be disposed proximate to and longitudinally with the at least one first air channel, the at least one second air channel may have a first end coupled to the diffuser, a second end distal from the first end, and at least one air distribution hole that may be disposed longitudinally along the at least one second air channel; and at least one channel divider that may be disposed to separate the at least one first air channel and the at least one second air channel, wherein the at least one channel divider may be coupled to a ceiling of the railcar.

One or more technical effects associated with certain embodiments herein may include, but are not limited to, achieving smooth air flow transition from an air conditioning unit to the railcar. Certain embodiments herein may also have a technical effect of evenly distributing conditioned air along the sides and center of the railcar. Certain other embodiments herein may also have a technical effect of minimizing temperature variations within the railcar. Certain other embodiments herein may also have a technical effect of minimizing spoilage of perishable products being transported by the railcar. Certain other embodiments herein may also have the technical effect of enabling air flow distribution in the railcar based on the type and configuration of packaging inside the railcar and/or based on the type of product to be transported within the railcar. The following provides detailed description of various example embodiments related to systems and methods for a ceiling-mounted air distribution plenum in a railcar.

Figure 1:
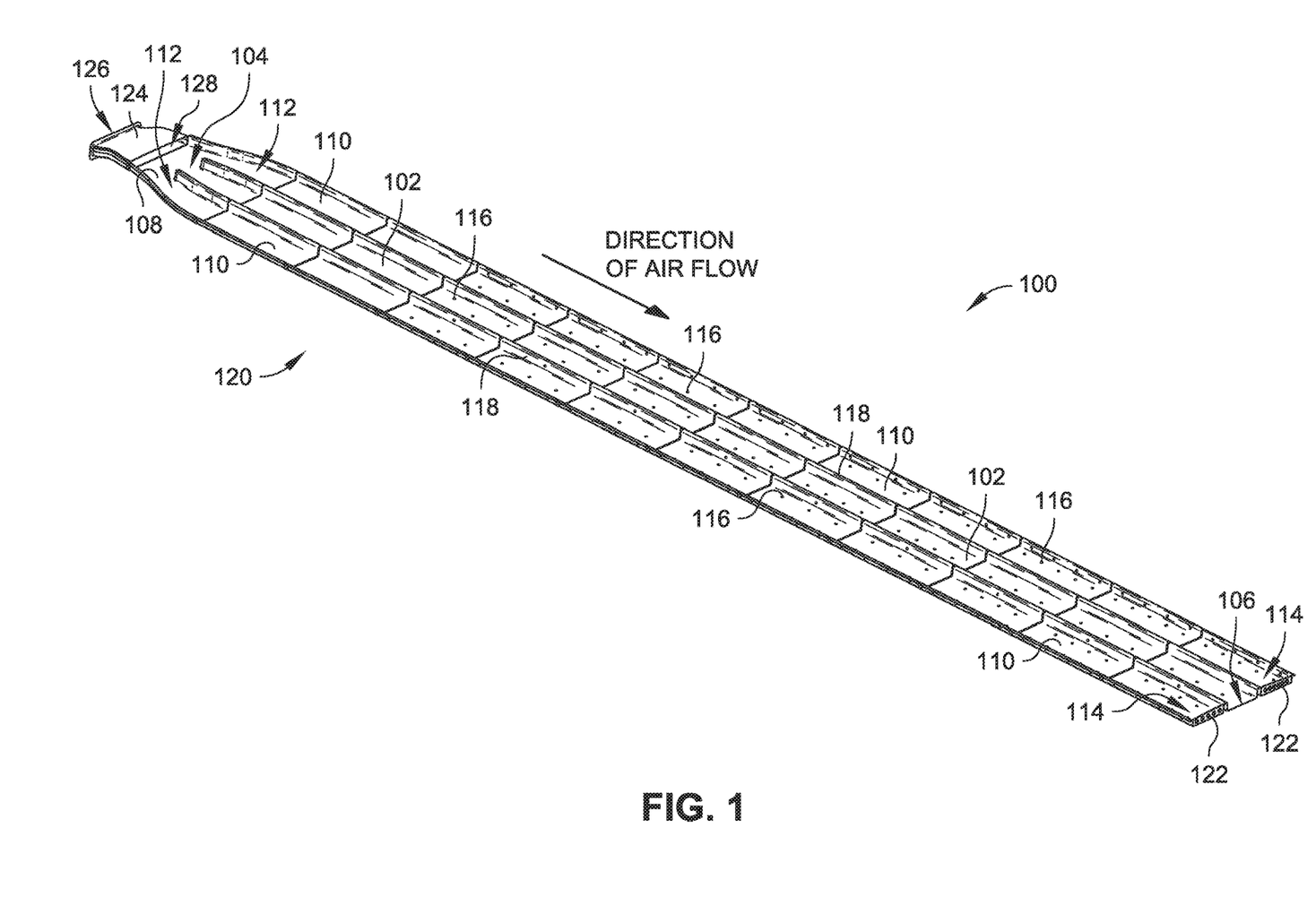
FIG. 1 is an isometric view of an air distribution plenum and an air distribution plenum assembly in accordance with an embodiment of the present disclosure.

FIG. 1 depicts an example air distribution plenum assembly 120 to implement certain systems and methods for a ceiling-mounted air distribution plenum in a railcar. According to an example embodiment of the disclosure, a ceiling-mounted air distribution plenum assembly 120 may include an air distribution plenum 100 that may include a diffuser 108 that may be configured to transmit conditioned air to at least one first air channel 102.

Again, referring to FIG. 1, in an example embodiment of the disclosure, the diffuser 108 may be connected at one end to an interface duct 124 and connected at the other end to one or more air channels. The diffuser 108 may adjust conditioned air from the geometry of the interface duct 124 or from the geometry of the air conditioning unit to the geometry of the air channels with minimal air flow disturbance. The diffuser 108 may also separate conditioned air into separate segments matching the air channels. The air distribution plenum 100 may include at least one first air channel 102 having a first end 104 that may be coupled to the diffuser 108 and a second end 106 distal from the first end 104. In an example embodiment of the disclosure, the at least one first air channel 102 may also have at least one air distribution hole 116 or air distribution nozzle disposed longitudinally along the at least one first air channel 102. The air distribution plenum 100 may further include at least one second air channel 110 that may be disposed proximate to and longitudinally with the at least one first air channel 102. The at least one second air channel 110 may have a first end 112 that may be coupled to the diffuser 108, a second end 114 distal from the first end 112. The at least one second air channel 110 may also have at least one air distribution hole 116 disposed longitudinally along the at least one second air channel 110. The air distribution plenum 100 may further include at least one channel divider 118 disposed to separate the at least one first air channel 102 and the at least one second air channel 110.

In an example embodiment of the disclosure, the at least one second air channel 110 may be disposed proximate to and parallel with the at least one first air channel 102. In other example embodiments, the at least one first air channel 102 and the at least one second air channel 110 may include tapering and change of cross section along a length of the railcar.

In another example embodiment of the disclosure, the interface duct 124 may include an end portion that may be tailored to match a geometry of the air conditioning unit. The air conditioning unit may be located behind a wall of the railcar. The interface duct 124 may be configured to adjust for a first offset from a centerline of the railcar and a second offset in height of the air conditioning unit 132 in the railcar. Thus, the interface duct 124 may allow the air distribution plenum 100 to be incorporated with air conditioning units of various sizes and from different Original Equipment Manufacturers (OEMs). The interface duct 124 may facilitate smooth air flow transition from the air conditioning unit 132 to the air distribution plenum 100 via the diffuser 108.

The example embodiment shown in FIG. 1 illustrates an air distribution plenum 100 including one first air channel 102 and two second air channels 110 and two channel dividers 118 separating them. In other example embodiments of the disclosure, there may be more or less first air channels 102 and more or less second air channels 110. In another example embodiment of the disclosure, at least one first air channel 102 is disposed between at least two second air channels 110. In an example embodiment of the disclosure, the at least one channel divider 118 is coupled to a ceiling of the railcar. The at least one channel divider 118 may be coupled to the ceiling of the railcar using fasteners. For example, the at least one channel divider 118 may be attached to the ceiling of the railcar using mechanical fasteners, such as bolts, rivets, and so on. In another example embodiment, an end or ends of the at least one channel divider 118 may be welded on to the ceiling, hence connecting the air distribution plenum 100 to the railcar. The fastening methods described herein are by way of example only. There may be other fastening methods that may be employed to attach the air distribution plenum 100 or the at least one channel divider 118 to the railcar.

In another example embodiment of the disclosure, the diffuser 108 may be directly coupled to the air conditioning unit. The diffuser 108 may include an end portion that may be tailored to match a geometry of the air conditioning unit. The diffuser 108 may also be configured to adjust for a first offset from a centerline of the railcar and a second offset in height of the air conditioning unit 132 in the railcar. Thus, the diffuser 108 may also allow the air distribution plenum 100 to be incorporated with air conditioning units of various sizes and from different Original Equipment Manufacturers (OEMs). The diffuser 108 may also facilitate smooth air flow transition from the air conditioning unit 132 to the air distribution plenum 100 via the interface duct 124.

When coupled and mounted to the ceiling of the railcar (not shown in FIG. 1), the at least one channel divider 118 along with the at least one first air channel 102, the at least one second air channel 110, and the ceiling of the railcar form one or more passages or conduits for air from the air conditioning unit to be passed through the air distribution plenum 100. This will be described in greater detailed in reference to FIG. 6.

Referring back to FIG. 1, air distribution holes 116 along the at least one first air channel 102 and along the at least one second air channel 110 allow conditioned air to be distributed into the railcar and help maintain uniform temperature along the railcar. In certain embodiments of the disclosure, all air distribution holes 116 may be of the same diameter. In certain other embodiments, air distribution holes 116 may be of varying diameter based at least in part on air distribution requirements in the railcar. In another example embodiment of the disclosure, the at least one first air channel 102 and/or the at least one second air channel 110 may not include any air distribution holes 116. In such cases, the at least one first air channel 102 or the at least one second air channel 110 may be used to transmit air from the air conditioning unit to the end of the railcar, for instance, to transfer conditioned air from one railcar to another. In another example embodiment of the disclosure, the at least one first air channel 102 may include greater number of air distribution holes 116 disposed in a section closer to the first end 104 than in a section closer to the second end 106. Thus, more air may be distributed into the railcar closer to the first end 104 than the second end 106. In another example embodiment of the disclosure, the at least one second air channel 110 may include greater number of air distribution holes 116 disposed in a section closer to the second end 114 than the first end 112. The spacing and number of air distribution holes 116 may also be based on the configuration and packaging of the goods to be transported in the railcar.

Referring again to FIG. 1, the at least one first air channel 102 and the at least one second air channel 110 may each be made of a single piece of material, or they may be manufactured in smaller sections as indicated in FIG. 1. Additionally, the air distribution plenum 100 may be constructed from any type of metallic, plastic or fiberglass type material. In an example embodiment of the disclosure, the air distribution plenum 100 may be extruded or constructed from aluminum. In other embodiments, the air distribution plenum 100 may be extruded in sections and connected together or may be constructed from a single piece of material.

Referring back to FIG. 1, the second end 106 of the at least one first air channel 102 may include: an open configuration or a throttled configuration. The configuration indicated in FIG. 1 shows an open configuration, where air from the diffuser 108 may reach the second end 106 with minimal restriction. In an example embodiment of the disclosure, the second end 106 of the at least one first air channel 102 may be connected to a second air distribution plenum 100, which may or may not be part of a different railcar. In another example embodiment, the second end 106 of the at least one first air channel 102 may include a throttled configuration wherein the second end 106 may be capped to completely block air flow. In other example embodiments of the disclosure, the second end 106 of the at least one first air channel 102 may be partially blocked to restrict air flow. In another example embodiment of the disclosure, the at least one second air channel 110 may include at least one damper 122 disposed along the length of the at least one second air channel. As indicated in FIG. 1, in an example embodiment of the disclosure, the at least one damper 122 may be located at the second end 114 of each second air channel 110. The at least one damper 122 may include a stationary damper 122 with holes, as indicated in FIG. 1, or an adjustable damper as described in FIG. 3A.

Figure 2:
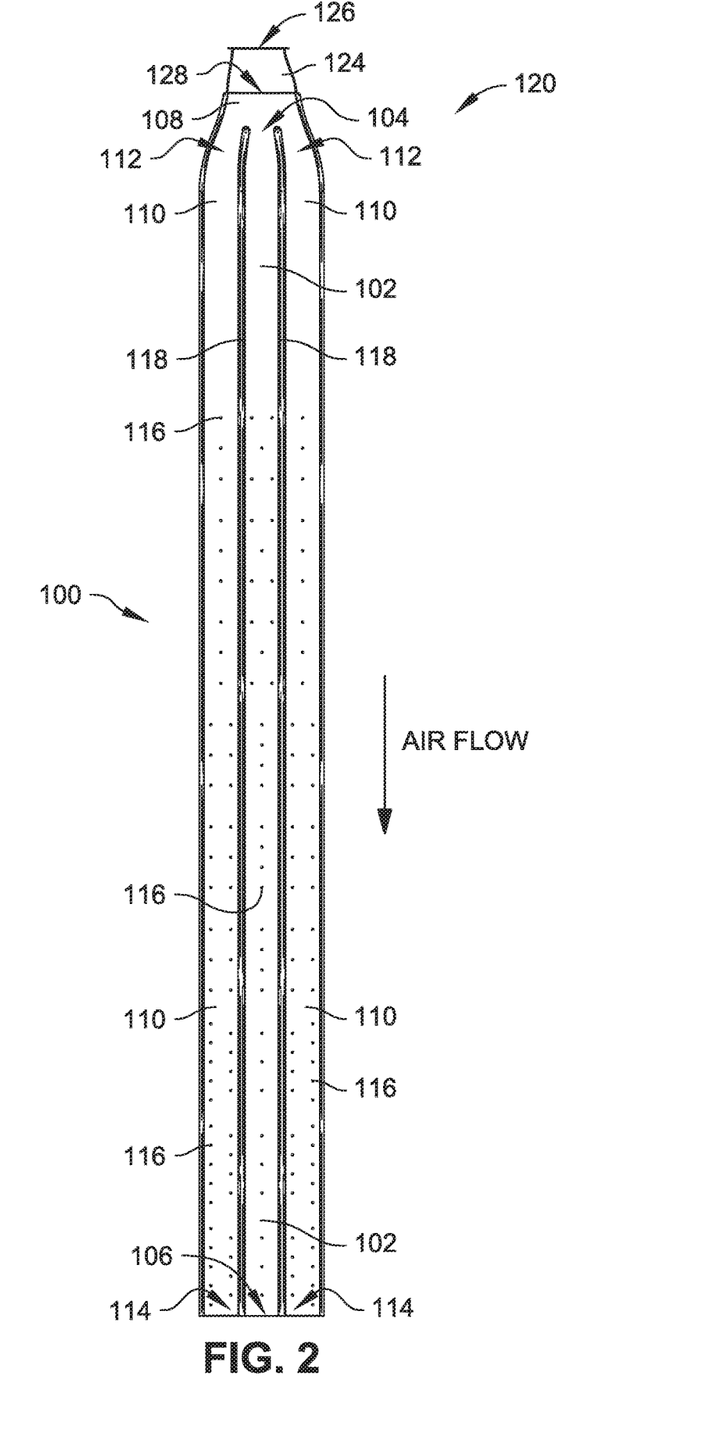
FIG. 2 is a top plan view of an air distribution plenum and an air distribution plenum assembly in accordance with an embodiment of the present disclosure.

Attention is now drawn to FIG. 2, which shows a top plan view of the air distribution plenum assembly 120 and the air distribution plenum 100 of FIG. 1. Conditioned air from the air conditioning unit may flow from the first end 126 of the interface duct 124 towards the second end 106 of the first air channel 102 and the second end 114 of the second air channels 110 in FIG. 2. While in FIG. 2, the first air channel 102 and the second air channels 110 are shown as covering the entire length of air distribution plenum 100, in other example embodiments of the disclosure, the at least one first air channel 102 and the at least one second air channel 110 may extend to only part of the air distribution plenum 100.

Figure 3A:
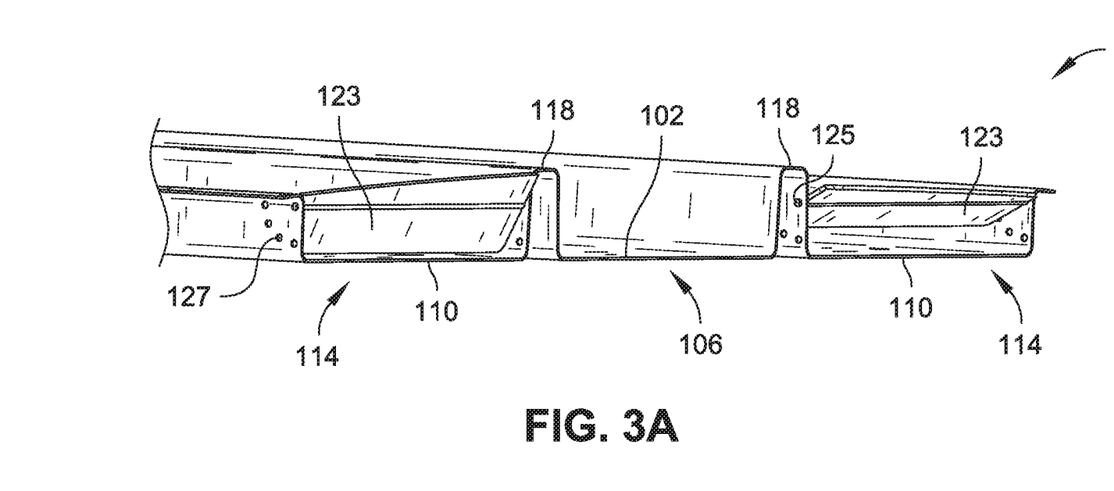
FIG. 3A is a partial isometric view of an air distribution plenum including a first air channel and multiple second air channels having a damper in accordance with an embodiment of the present disclosure.
Figure 3B:
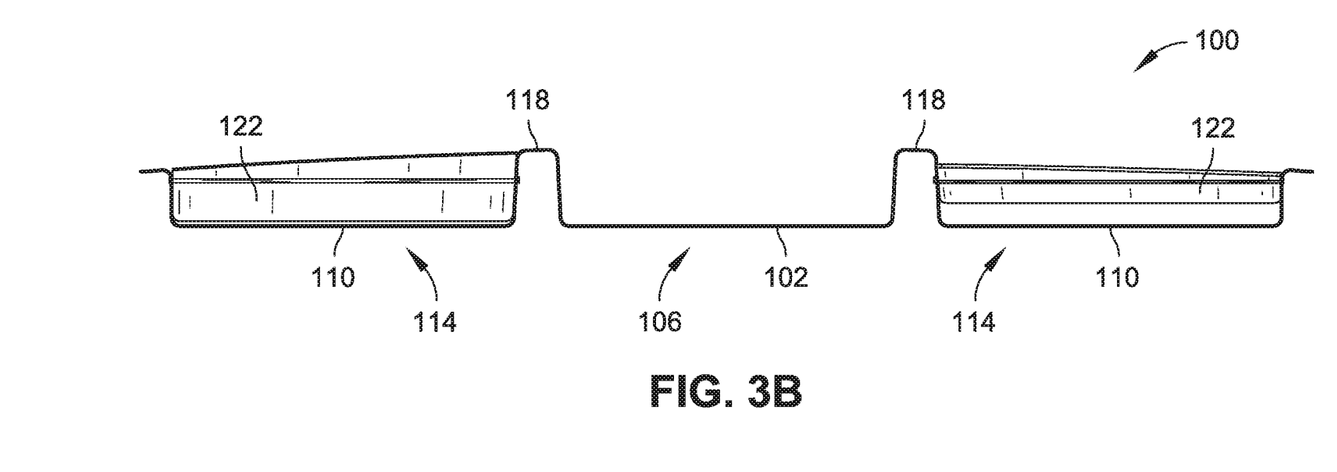
FIG. 3B is a side elevation view of an air distribution plenum including a first air channel and multiple second air channels having a damper in accordance with the present disclosure.

Referring now to FIG. 3A, a partial isometric view of an air distribution plenum 100 including a first air channel 102 and two second air channels 110 having a damper is illustrated. FIG. 3B is a side elevation view of the air distribution plenum 100 including a first air channel 102 and two second air channels 110 having a damper in accordance with an example disclosure. FIG. 3A shows an air distribution plenum 100 that may include a solid damper 123 that may be adjustable based on the air flow rate required at the second end 114 of the second air channel 110. Also indicated are adjustment holes 127 as well as a damper rod 125 that may be used to adjust the damper position and hold the damper within the at least one second air channel 110 respectively. FIG. 3B is a side elevation view from the second end 106 of the at least one first air channel 102, the at least one second air channel 110, and the channel dividers 118, including the dampers 122. Additional features illustrated in FIG. 3A and FIG. 3B include the second edge (lip) of the second air channels 110 that may attach the railcar ceiling (not shown).

Figure 4:
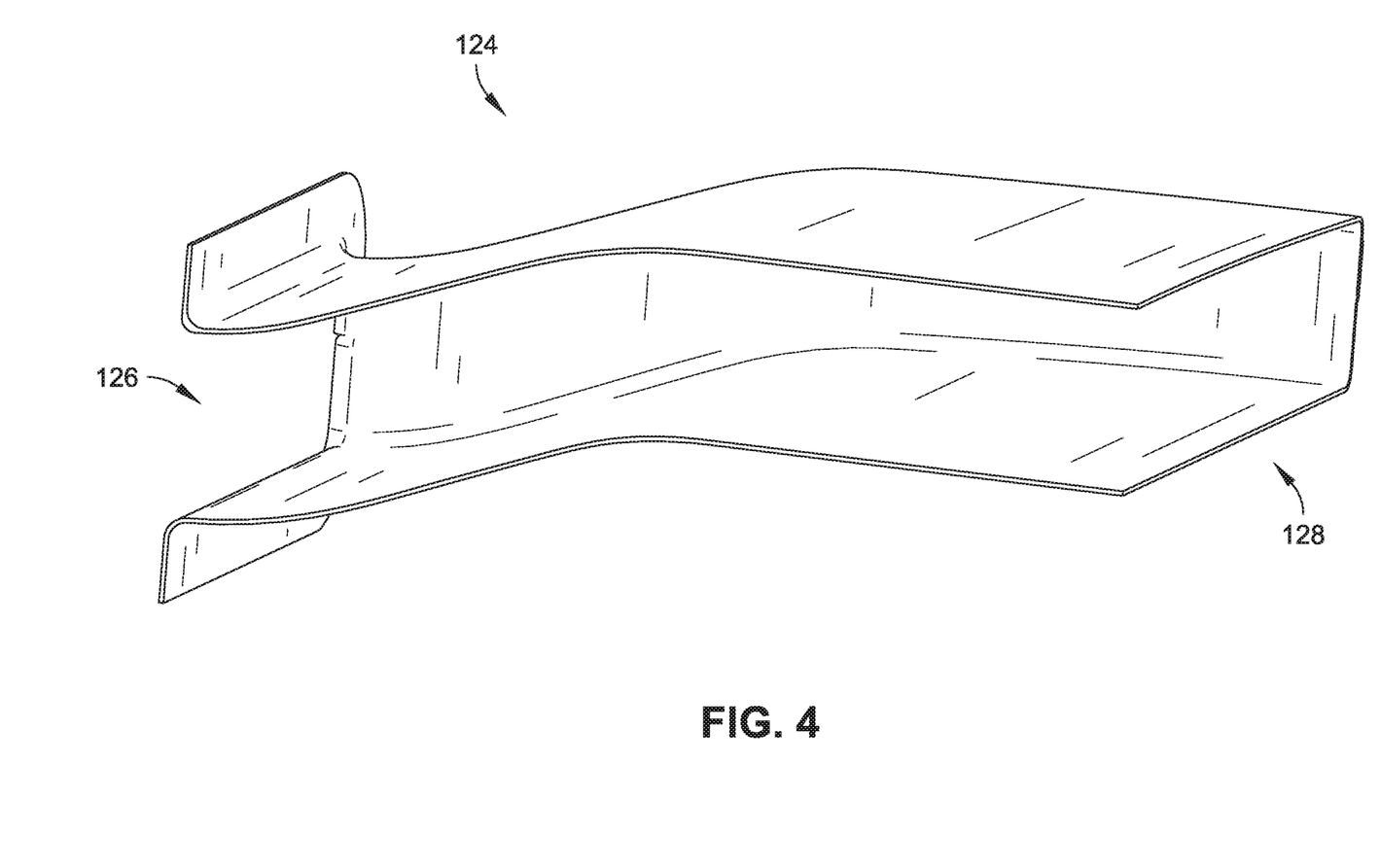
FIG. 4 is a partial isometric cross section view illustrating an interface duct in accordance with the present disclosure.

FIG. 4 illustrates a partial isometric cross section view of the interface duct 124. The first end 126 may couple to the air conditioning unit to receive conditioned air. The first end 126 may be unique for each application depending on the configuration and geometry of the air condition unit that the interface duct 124 may be coupled to. The second end 128 of the interface duct 124 may be coupled to a diffuser 108 as described in FIG. 1-2. The shape of the interface duct 124 as indicated in FIG. 4 is by way of an example only. Other configurations of the interface duct 124 may be envisioned based on flow transition needs, space limitations, air conditioning system OEM, and so on.

Figure 5:
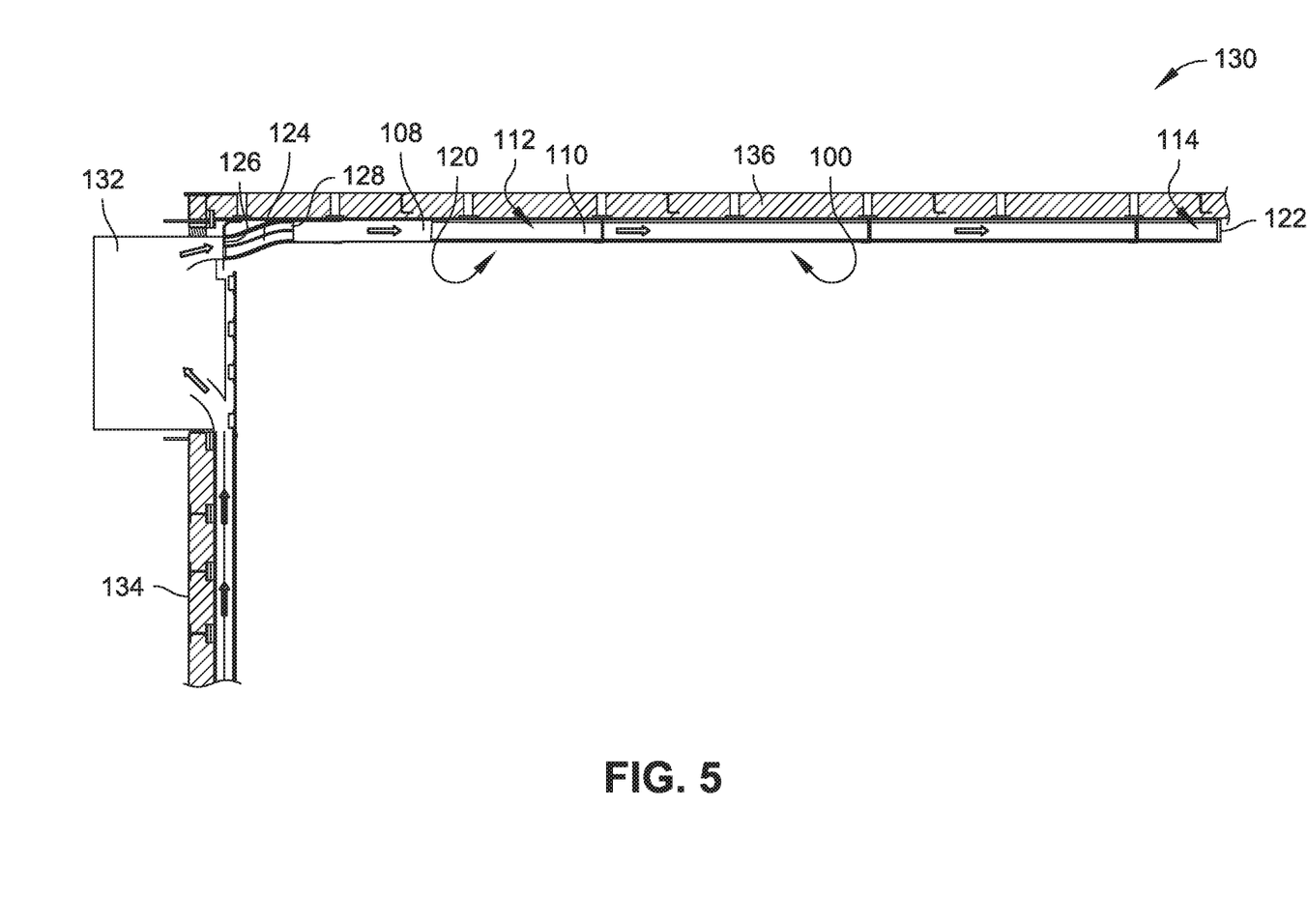
FIG. 5 is a side cross section view of a rail car system employing an air distribution plenum and an air distribution plenum assembly in accordance with the present disclosure.

FIG. 5 describes a side cross-sectional view of the railcar system 130. The railcar system 130 may include the railcar 134. As shown in FIG. 5, an air conditioning unit 132 may provide conditioned air to the interface duct 124, which in turn transmits the air to the diffuser 108, which is further coupled to the air distribution plenum assembly 120 mounted to the ceiling 136 of the railcar 134 that may include the air distribution plenum 100, which further includes at least one first air channel 102 and at least one second air channel 110, and at least one channel divider 118. As shown at the bottom of FIG. 5, return air from the railcar 134 may go back into the air conditioning unit 132 to be conditioned.

Figure 6:
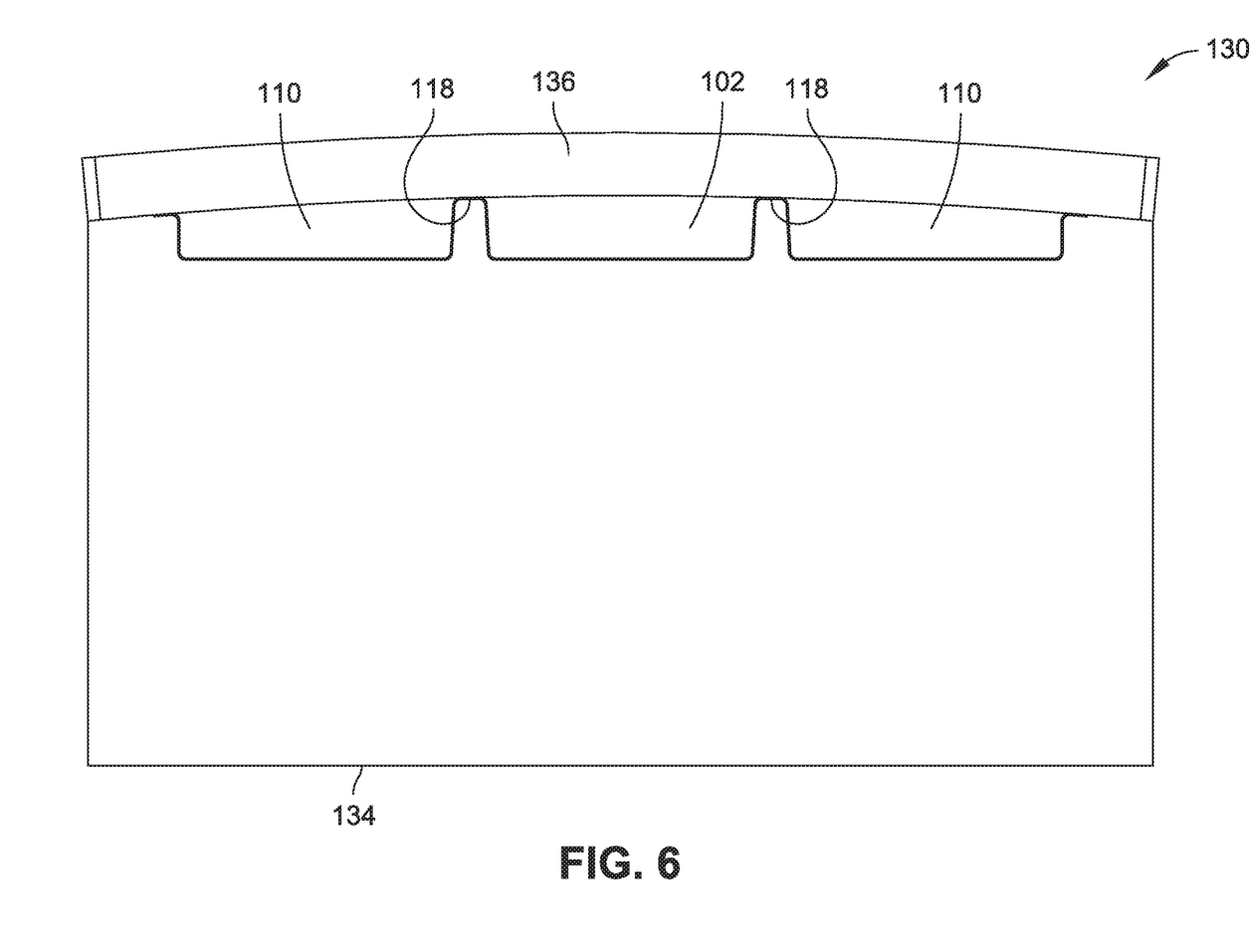
FIG. 6 is a side elevation view of a rail car system employing an air distribution plenum and an air distribution plenum assembly in accordance with the present disclosure.

Referring now to FIG. 6, another side elevation view of the railcar system 130 may be described. As shown in FIG.

6, the ceiling 136 of the railcar system 130, one first air channel 102, two second air channels 110, and two channel dividers 118 may encompass three cavities or pathways for conditioned air from the air conditioning unit 132 to be transmitted to the railcar system 130. As shown in FIG. 6, the ceiling 136 of the railcar 134 can cover and complete the at least one first air channel 102 and the at least one second air channel 110. As depicted in FIG. 6, in an example embodiment of the disclosure, the air distribution plenum 100 may substantially cover the cross-sectional width of the railcar 134. The illustration of the air distribution plenum 100 in the railcar assembly system 130 of FIG. 6 is by way of an example only. In other embodiments of the disclosure, the air distribution plenum 100 may include fewer or more number of first air channels 102 and fewer or more number of second air channels 110. Also, in another example embodiment of the disclosure, the air distribution plenum 100 may not substantially cover the entire cross-sectional width of the railcar 134.

While aspects of the disclosure have been described in terms of illustrative embodiments thereof, it will be understood by those skilled in the art that the disclosure is not limited to these embodiments. Many modifications and other embodiments of the example descriptions set forth herein to which these descriptions pertain will come to mind having the benefit of the teachings presented in the foregoing descriptions and the associated drawings. Furthermore, for example, the air distribution plenum may be adapted for use in an intermodal container, a truck, a boat, a vessel, or any other container or vehicle. While a ceiling mounted air distribution plenum has been described in example embodiments, the air distribution plenum may also be mounted to a wall of a railcar. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation. Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

That which is claimed is:

1. A ceiling-mounted air distribution plenum, comprising:
   at least one first air channel;
   a diffuser configured to transmit air to the at least one first air channel;
   the at least one first air channel having a first end coupled to the diffuser, a second end distal from the first end;
   at least one second air channel disposed proximate to and longitudinally with the at least one first air channel, the at least one second air channel having a first end coupled to the diffuser, a second end distal from the first end, and at least one air distribution hole disposed longitudinally along the at least one second air channel; and
   at least one channel divider disposed to separate the at least one first air channel and the at least one second air channel.

2. The ceiling-mounted air distribution plenum of claim 1, further comprising an interface duct configured to transmit air from an air conditioning unit to the diffuser.

3. The ceiling-mounted air distribution plenum of claim 1, wherein the at least one second air channel includes two second air channels, and wherein the at least one first air channel is disposed between the two second air channels.

4. The ceiling-mounted air distribution plenum of claim 1, wherein the at least one first air channel comprises at least one air distribution hole disposed longitudinally along the at least one first air channel.

5. The ceiling-mounted air distribution plenum of claim 1, wherein the at least one first air channel comprises greater number of air distribution holes disposed in a section proximate to the first end than in a section proximate to the second end.

6. The ceiling-mounted air distribution plenum of claim 1, wherein the at least one second air channel comprises greater number of air distribution holes disposed in a section proximate to the second end than in a section proximate to the first end.

7. The ceiling-mounted air distribution plenum of claim 1, wherein the at least one second air channel includes at least one damper, wherein the at least one damper comprises: a stationary damper or an adjustable damper.

8. The ceiling-mounted air distribution plenum of claim 1, wherein the second end of the at least one first air channel comprises: an open configuration or a throttled configuration.

9. The ceiling-mounted air distribution plenum of claim 1, wherein the second end of the at least one first air channel is connected to an additional ceiling-mounted air distribution plenum.

10. The ceiling-mounted air distribution plenum of claim 1, wherein the at least one channel divider is coupled to a railcar ceiling.

11. The ceiling-mounted air distribution plenum of claim 1, wherein the at least one first air channel includes a plurality of air distribution holes disposed longitudinally along the at least one first air channel, and wherein a density of the plurality of air distribution holes along the at least one first air channel is greater proximate to the first end than proximate to the second end.

12. The ceiling-mounted air distribution plenum of claim 11, wherein the at least one second air channel includes a plurality of air distribution holes disposed longitudinally along the at least one second air channel, and wherein a density of the plurality of air distribution holes along the at least one second channel is greater proximate to the second end than proximate to the first end.

13. A railcar system, comprising:
   a railcar;
   a diffuser configured to transmit air to at least one first air channel; and
   a ceiling-mounted air distribution plenum assembly coupled to the railcar, the ceiling-mounted air distribution plenum assembly comprising:
      the least one first air channel having a first end coupled to the diffuser, a second end distal from the first end, wherein the at least one first air channel extends substantially a length of the railcar;
      at least one second air channel disposed proximate to and longitudinally with the at least one first air channel, the at least one second air channel having a first end coupled to the diffuser, a second end distal from the first end, and at least one air distribution hole disposed longitudinally along the at least one second air channel; and at least one channel divider disposed to separate the at least one first air channel and the at least one second air channel, wherein the at least one channel divider is coupled to a ceiling of the railcar.

\* \* \* \* \*